United States Patent [19]

Krommer et al.

[11] Patent Number: 4,714,602

[45] Date of Patent: Dec. 22, 1987

[54] PROCESS FOR THE PREPARATION OF SOLID SODIUM HYDROGEN CYANAMIDE

[76] Inventors: Helmut Krommer, Fasanenstrasse, D-8223 Trostberg; Karl-Heinz Neuhauser, Am-Ederberg 3, D-8261 Taufkirchen-Gallenbach; Stefan Weiss, Sonnenleite 8, D-8223 Trostberg, all of Fed. Rep. of Germany

[21] Appl. No.: 886,014

[22] Filed: Jul. 16, 1986

Related U.S. Application Data

[63] Continuation-in-part of Ser. No. 745,789, Jun. 17, 1985, abandoned.

[30] Foreign Application Priority Data

Jun. 18, 1984 [DE] Fed. Rep. of Germany ....... 3422595

[51] Int. Cl.$^4$ ................................................ C01C 3/16
[52] U.S. Cl. .................................................... 423/369
[58] Field of Search ......................................... 423/369

[56] References Cited

U.S. PATENT DOCUMENTS 2,557,997  6/1951  Phelps et al. ...................... 423/369

FOREIGN PATENT DOCUMENTS 449107  6/1948  Canada ............................... 423/369

*Primary Examiner*—John Doll
*Assistant Examiner*—Wayne A. Langel
*Attorney, Agent, or Firm*—Kenneth P. Glynn

[57] ABSTRACT

The present invention relates to a process for the preparation of solid sodium hydrogen cyanamide by reacting cyanamide with sodium hydroxide in aqueous solution, the aqueous solution or suspension containing sodium hydrogen cyanamide being concentrated to dryness with the aid of a drier device which uses heating gases, preferably, a spray drier or atomization drier, and, if appropriate, the product then being dried. A pulverulent product with good flow properties, purity and storage stability is thereby obtained in an industrially simple manner.

7 Claims, No Drawings

PROCESS FOR THE PREPARATION OF SOLID SODIUM HYDROGEN CYANAMIDE

REFERENCE TO RELATED APPLICATIONS

This application is a continuation-in-part of U.S. application Ser. No. 06/745,789, filed on June 17, 1985 by Helmut Krommer, Karl-Heinz Neuhauser and Stefan Weiss, entitled "Process For The Preparation Of Solid Sodium Hydrogen Cyanamide," now abandoned. Said U.S. patent application Ser. No. 06/745,789 was filed with a claim for foreign priority under 35 USC 119 based on Federal Republic of Germany Application No. P 34 22 595.1, filed on June 18, 1984, and a claim for foreign priority based on the common subject matter is claimed herein based on the same Federal Republic of Germany Application (No. P 34 22 595.1, filed on June 18, 1984).

BACKGROUND OF THE INVENTION

1. Field of the Invention

The present invention relates to the preparation of solid (in particular, pulverulent and free-flowing) sodium hydrogen cyanamid (monosodium cyanamide).

2. Prior Art Statement

It is known that sodium hydrogen cyanamide can be prepared by reacting cyanamide with sodium methylate or sodium ethylate in alcohols (compare E. Drechsel; J. prakt. Chemie 11 284/53, page 311, 1875). According to German Offenlegungsschrift No. 2,358,903, it is also possible to use anhydrous sodium hydroxide as the base, instead of the alcoholates, aliphatic alcohols with 3 to 6 C atoms being used as solvents.

Although these preparation methods give highly pure sodium hydrogen cyanamide, solid cyanamide and sodium alcoholates or solid sodium hydroxide must be used as starting substances in these processes. Furthermore these prior art processes must be carried out in alcohols which are as anhydrous as possible. This makes these processes fairly troublesome and expensive and therefore of no interest on an industrial scale.

Attempts have therefore been made to react cyanamide in aqueous solution with sodium hydroxide solution, which in principle is also possible. However, the aqueous solutions of sodium hydrogen cyanamide thus obtained are not very stable and already decompose slowly at room temperature, urea, ammonia, sodium carbonate and dicyandiamide, inter alia, being formed.

The aqueous solutions must therefore be concentrated under extremely gentle conditions in vacuo in order to isolate the sodium hydrogen cyanamide formed, which moreover is very water-soluble. These gentle conditions can still just be realized on a laboratory scale with the aid of a rotary evaporator. However, considerable difficulties arise in applying this method on an industrial scale.

SUMMARY OF THE INVENTION

The present invention thus relates to the preparation of solid sodium hydrogen cyanamide by reacting cyanamide with sodium hydroxide in aqueous solution. The aqueous solution (or suspension) containing sodium hydrogen cyanamide is concentrated to dryness with the aid of a spray drier or atomization drier and, if appropriate, the product is then dried further. The spray drier or atomization drier utilizes normal air as the heating gas or uses carbon dioxide-free air or nitrogen gas.

DETAILED DESCRIPTION OF THE PRESENT INVENTION AND EXAMPLES

The present invention was therefore based on the object of developing a process for the preparation of solid sodium hydrogen cyanamide which does not have the known disadvantages of the prior art but which enables a solid sodium hydrogen cyanamide to be prepared in good purity with agents which ar relatively simple from the industrial point of view.

According to the invention, this object was achieved by concentrating the solution or suspension containing the sodium hydrogen cyanamide to dryness with the aid of a drier device which uses a heating gas, such as a spray drier or atomization drier, and, if appropriate, then further drying the product.

In particular, it has been found, surprisingly, that a pulverulent free-flowing product of high fineness and reactivity which is thus outstandingly suitable for further reaction and does not cake even after a prolonged storage period is obtained with the aid of the process according to the invention.

The preconception that sodium hydrogen cyanamide is always obtained as a moisture-sensitive substance (compare Angew. Chem. 86, page 590, 1974) has thus been overcome.

In the process according to the invention, immediately after the reaction of the aqueous cyanamide solution with sodium hydroxide solution, the aqueous solution or suspension of sodium hydrogen cyanamide is passed to a drier device which uses a heating gas, preferably a spray drier or an atomization drier (the solids content of these solutions or suspensions as a rule being between 20% and 70% by weight before drying). The drier device may use available air as the heating gas or other heating gases as described herein.

Although sodium hydrogen cyanamide is a strong base, the spray drying or atomization drying according to the invention may also be carried out with a heating gas of air which contains carbon dioxide. The products dried in this manner contain on average 3%-10% of sodium carbonate.

If a product which is almost free from sodium carbonate is to be obtained, air which is free from carbon dioxide must consequently be used. The removal of carbon dioxide from the air can be effected by known methods, such as, for example, with the aid of molecular sieves, sodium hydroxide solution, calcium oxide or calcium hydroxide. Instead of air, it is also possible to use inert gas, such as, for example, nitrogen, as the heating gas.

The spray driers or atomization driers should be operated such that the inlet temperature of the heating gases is between 110° and 200° C. and the outlet temperature is between 40° and 120° C. In this way, it is ensured that the product is concentrated and dried relatively rapidly but without substantial decomposition.

Spray driers or atomization driers which can be used are all the devices which are customary in the art. Preferred atomization driers and the disc atomizers which can be incorporated by hanging or standing and these have proved particularly advantageous. However, one- or two-compartment nozzle driers can also be used as atomization driers in the process of the present invention without problems.

After the concentration of the solution or suspension, the sodium hydrogen cyanamide is obtained as a fine-particled powder with a purity of about 82%-94% and a residual moisture content of approximately 1% to 3%. If necessary, the product can also be subjected to after-drying.

The process according to the invention can be applied on a large industrial scale without problems, because it requires little expenditure and gives a product of good purity which has excellent flow properties and is stable on storage.

The following examples are intended to illustrate the invention in more detail, but without limiting it thereto.

Examples:

In the following Examples 1 and 2, a centrifugal atomization unit was used: Niro Atomizer, type M-02/B, transportable Minor; the drying tower has a diameter of 800 mm and a cylindrical height of 600 mm and is equipped with a 60° conical bottom section.

EXAMPLE 1

5,196 g (63 moles) of 48.5% strength technical grade sodium hydroxide solution were taken in a 10 l three-necked flask and 5,096 g (60 moles) of 49.5% strength aqueous cyanamide solution (SKW Cyanamid L 500) were then introduced in the course of 4.5 hours, with thorough stirring and external cooling, such that the internal temperature did not rise above 25° C. The reaction solution thus obtained was then fed into the centrifugal atomizer described above in the course of 4 hours and 20 minutes (2,375 g/hour). The inlet temperature of the normal air here was 158° C. (85 kg of air/hour), and the waste air temperature was 98°–99° C. The atomizer wheel was operated at a speed of rotation of about 34,000 rpm.

When the spray drying had ended, the weighings were made:

(a) Product deposited in the receiver (in the powder glass):

3,758 g (97.8%) of sodium hydrogen cyanamide
Content: 87.0%; N calculated: 43.76%; N found: 41.20%
dicyandiamide found: 2.9%
urea found: 2.6%
sodium carbonate found: 5.3%
water found (by the Karl Fischer method): 2.3%

(b) Product which has settled on the wall of the drier and was removed at the end of the experiment:

208 g (5.4%) of sodium hydrogen cyanamide
Content: 83.9%; N calculated: 43.76%; N found: 40.62%
dicyandiamide found: 2.9%
urea found: 2.4%
sodium carbonate found: 9.2%
water found (by the Karl Fischer method): 1.8%

EXAMPLE 2

Experiment 1 was repeated, but nitrogen was used instead of normal air. In this case, the product deposited in the receiver contained only 0.4% of sodium carbonate and had a sodium hydrogen cyanamide content of 91.6%. 0.6% of sodium carbonate and 90.4% of sodium hydrogen cyanamide were found for the product which has settled on the wall of the drier.

Obviously, numerous modifications and variations of the present invention are possible in light of the above teachings. It is therefore to be understood that within the scope of the appended claims, the invention may be practiced otherwise than as specifically described herein.

What is claimed is:

1. A process for the preparation of solid sodium hydrogen cyanamide, which comprises:
    (a) reacting cyanamide with sodium hydroxide in aqueous solution; and
    (b) concentrating the aqueous solution containing sodium hydrogen cyanamide with a drier device which uses a heating gas, said drier device being either a spray drier or an atomization drier, wherein the heating gas enters said drier device at a temperature of 110° C. to 200° C. and exits at a cooler temperature of 40° C. to 120° C. to produce a fine-particled powder having a moisture content of approximately 1 to 3% by weight.

2. The process as claimed in claim 1, wherein the aqueous solution has a solids content of 20%–70% by weight.

3. The process as claimed in claim 2, wherein air which is free from carbon dioxide is used as the heating gas.

4. The process as claimed in claim 3, wherein nitrogen is used as the heating gas.

5. The process as claimed in claim 4, wherein the atomization drier is a disc atomizer.

6. The process as claimed in claim 5, wherein said atomization drier is a two component nozzle atomization device.

7. The process as claimed in claim 6, wherein after said concentrating step, the sodium hydrogen cyanamide is subjected to after-drying.

* * * * *